(12) United States Patent
Knapp et al.

(10) Patent No.: US 8,901,030 B2
(45) Date of Patent: Dec. 2, 2014

(54) SORBENT SUBSTRATES FOR $CO_2$ CAPTURE AND METHODS FOR FORMING THE SAME

(71) Applicant: Corning Incorporated, Corning, NY (US)

(72) Inventors: Karen Jo Knapp, Addison, NY (US); Steven Bolaji Ogunwumi, Painted Post, NY (US); Elizabeth Margaret Wheeler, Lindley, NY (US); John Forrest Wight, Jr., Corning, NY (US); James William Zimmermann, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/246,509

(22) Filed: Apr. 7, 2014

(65) Prior Publication Data

US 2014/0216639 A1    Aug. 7, 2014

Related U.S. Application Data (62) Division of application No. 13/233,438, filed on Sep. 15, 2011, now Pat. No. 8,728,218.

(51) Int. Cl.

| | |
|---|---|
| *B01D 53/02* | (2006.01) |
| *B01J 20/32* | (2006.01) |
| *B01J 20/30* | (2006.01) |
| *B01J 20/28* | (2006.01) |
| *B01J 20/16* | (2006.01) |
| *B01D 53/04* | (2006.01) |
| *B29C 47/00* | (2006.01) |
| *B29C 47/02* | (2006.01) |
| *B29C 47/04* | (2006.01) |
| *B29C 47/30* | (2006.01) |
| *B29C 47/28* | (2006.01) |

(52) U.S. Cl.
CPC .......... *B01J 20/3293* (2013.01); *B01J 20/3007* (2013.01); *B01J 20/3035* (2013.01); *B01J 20/3078* (2013.01); *B01J 20/3057* (2013.01); *B01J 20/28054* (2013.01);

(Continued)

(58) Field of Classification Search
USPC ................. 95/139; 502/400; 96/108, 153, 154
See application file for complete search history.

(56) References Cited

U.S. PATENT DOCUMENTS

| 5,510,063 A | 4/1996 | Gadkaree et al. ............ 264/29.7 |
| 6,299,958 B1 | 10/2001 | St. Julien et al. ............... 428/73 |

(Continued)

FOREIGN PATENT DOCUMENTS

| WO | 2008/143968 | 11/2008 |
| WO | 2009/003171 | 12/2008 |
| WO | 2009/003174 | 12/2008 |

*Primary Examiner* — Christopher P Jones (57) ABSTRACT

Sorbent substrates for $CO_2$ capture and methods for forming the same are disclosed. In one embodiment, a method for forming a sorbent substrate for $CO_2$ capture may include forming a plurality of matrix rods from a sorbent material and forming a plurality of channel rods from a support material. The plurality of matrix rods may then be co-extruded with the plurality of channel rods to form a plurality of sorbent filaments comprising a matrix of the sorbent material in which channels of support material are positioned such that the channels extend in an axial direction of each of the plurality of sorbent filaments. The plurality of sorbent filaments may then be stacked to form a filament assembly in which the plurality of sorbent filaments are axially aligned. Thereafter, the plurality of sorbent filaments of the filament assembly may be bonded to one another to form the sorbent substrate.

16 Claims, 6 Drawing Sheets

(52) U.S. Cl.
CPC .......... *B01J 20/165* (2013.01); *B01J 20/28045* (2013.01); *B01D 53/0407* (2013.01); *B29C 47/0014* (2013.01); *B29C 47/027* (2013.01); *B29C 47/04* (2013.01); *B29C 47/30* (2013.01); *B01J 20/305* (2013.01); *B01D 2253/108* (2013.01); *B01D 2253/311* (2013.01); *B01D 2257/504* (2013.01); *Y02C 10/08* (2013.01); *Y02C 10/04* (2013.01); *B01D 2253/204* (2013.01); *B01D 2253/25* (2013.01); *B01D 2253/34* (2013.01); *B29C 47/0016* (2013.01); *B29C 47/28* (2013.01); *B01D 2253/10* (2013.01); *B01D 2253/20* (2013.01)
USPC .................. 502/400; 95/139; 96/108; 96/153; 96/154

(56) References Cited

U.S. PATENT DOCUMENTS

| | | | | |
|---|---|---|---|---|
| 6,500,236 | B2 * | 12/2002 | Suzuki et al. | 95/113 |
| 7,250,150 | B1 * | 7/2007 | Keefer et al. | 423/651 |
| 7,452,837 | B2 | 11/2008 | Goretta et al. | 501/95.1 |
| 7,731,782 | B2 | 6/2010 | Kelley et al. | 95/139 |
| 2002/0130434 | A1 | 9/2002 | Rigali et al. | 264/171.13 |
| 2004/0137286 | A1 | 7/2004 | Hilmas et al. | 429/12 |
| 2008/0314246 | A1 * | 12/2008 | Deckman et al. | 95/130 |
| 2009/0025555 | A1 * | 1/2009 | Lively et al. | 95/114 |
| 2011/0247495 | A1 * | 10/2011 | Marco et al. | 95/127 |
| 2012/0222555 | A1 * | 9/2012 | Gupta et al. | 95/136 |
| 2012/0272823 | A1 * | 11/2012 | Halder et al. | 95/139 |

* cited by examiner

SORBENT SUBSTRATES FOR $CO_2$ CAPTURE AND METHODS FOR FORMING THE SAME

CROSS-REFERENCE TO RELATED APPLICATIONS

This is a divisional of U.S. patent application Ser. No. 13/233,438 filed on Sep. 15, 2011, the content of which is relied upon and incorporated herein by reference in its entirety, and the benefit of priority under 35 U.S.C. §120 is hereby claimed.

BACKGROUND

1. Field

The present specification generally relates to substrates for capturing $CO_2$ from a process gas stream and, more specifically, to sorbent substrates for capturing $CO_2$ from a process gas stream which are formed from co-extruded sorbent filaments comprising a plurality of through-channels and methods for making the same.

2. Technical Background $CO_2$ is a greenhouse gas that has been linked to global warming $CO_2$ is a bi-product of various industrial processes such as, for example, coal-fired power plants, purification of natural gas, oil recovery systems and the like. From an environmental perspective, carbon trading and future regulations of carbon emissions from flue gasses and other $CO_2$ point sources are economic drivers for improving the efficiency of $CO_2$ capture technologies.

Various technologies are currently being used and/or developed to improve the capture of $CO_2$ from process gas streams. Such technologies include, for example, the liquid amine (MEA or KS-1) process, the chilled ammonia process and gas membranes. While each of these technologies is effective for removing $CO_2$ from a process gas stream, each technology also has drawbacks. For example, the amine process has associated reactor corrosion issues, high capital costs and is considered to be very energy intensive to operate. The chilled ammonia process is still in its early phases of development and the commercial feasibility of the process is not yet known. Some possible challenges with the chilled ammonia process include ammonia volatility and the potential contamination of the ammonia from gaseous contaminants such as $SO_x$ and $NO_x$. Various gas membrane technologies are currently employed for the removal of $CO_2$ from process gas streams. However, processes utilizing gas membrane technologies require multiple stages and/or recycling in order to achieve the desired amount of $CO_2$ separation. These multiple stages and/or recycling add significant complexity to the $CO_2$ recovery process as well as increase the energy consumption and cost associated with the process. Gas membrane technologies also typically require high pressures and associated space constraint which makes use of the technology difficult in installations with limited space such as offshore platforms.

Accordingly, a need exists for alternative methods and apparatuses which may be used to recover $CO_2$ from process gas streams.

SUMMARY

According to various embodiments, a method for forming a sorbent substrate for $CO_2$ capture may include forming a plurality of matrix rods from a sorbent material for adsorbing $CO_2$ from a gas stream and forming a plurality of channel rods from a support material. The plurality of matrix rods may then be co-extruded with the plurality of channel rods to form a plurality of sorbent filaments comprising a matrix of the sorbent material in which channels of support material are positioned such that the channels of support material extend in an axial direction of each of the plurality of sorbent filaments. The plurality of sorbent filaments may then be stacked to form a filament assembly in which the plurality of sorbent filaments are axially aligned. Thereafter, the plurality of sorbent filaments of the filament assembly may be bonded to one another to form the sorbent substrate.

According to further embodiments, a method for forming a sorbent substrate for $CO_2$ capture may include forming a plasticized batch of matrix material comprising a sorbent material for adsorbing $CO_2$ from a gas stream and forming a plasticized batch of fugitive material. The plasticized batch of matrix material may then be co-extruded with the plasticized batch of fugitive material to form a plurality of sorbent filaments comprising a matrix of the sorbent material having channels of fugitive material extending in an axial direction of each of the plurality of sorbent filaments. The plurality of sorbent filaments may be stacked to form a filament assembly such that the plurality of sorbent filaments are axially aligned in the filament assembly. The filament assembly may be radially compacted. Thereafter, the fugitive material may be removed from the filament assembly to form a plurality of through-channels in each of the plurality of sorbent filaments. The filament assembly may be heated to bond the plurality of sorbent filaments to one another to form the sorbent substrate.

According to still further embodiments, a sorbent substrate for $CO_2$ capture may include a plurality of sorbent filaments. Each sorbent filament of the plurality of sorbent filaments may include a matrix of sorbent material in which a plurality of through-channels are formed such that the through-channels extend through the matrix of sorbent material from a first end of each sorbent filament to a second end of each sorbent filament in an axial direction of each sorbent filament. The sorbent material may be capable of adsorbing $CO_2$ from a gas stream. The plurality of sorbent filaments may be axially aligned with one another such that the plurality of through-channels of the plurality of sorbent filament are substantially parallel with one another. Each sorbent filament of the plurality of sorbent filaments may be bonded to at least one other sorbent filament.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
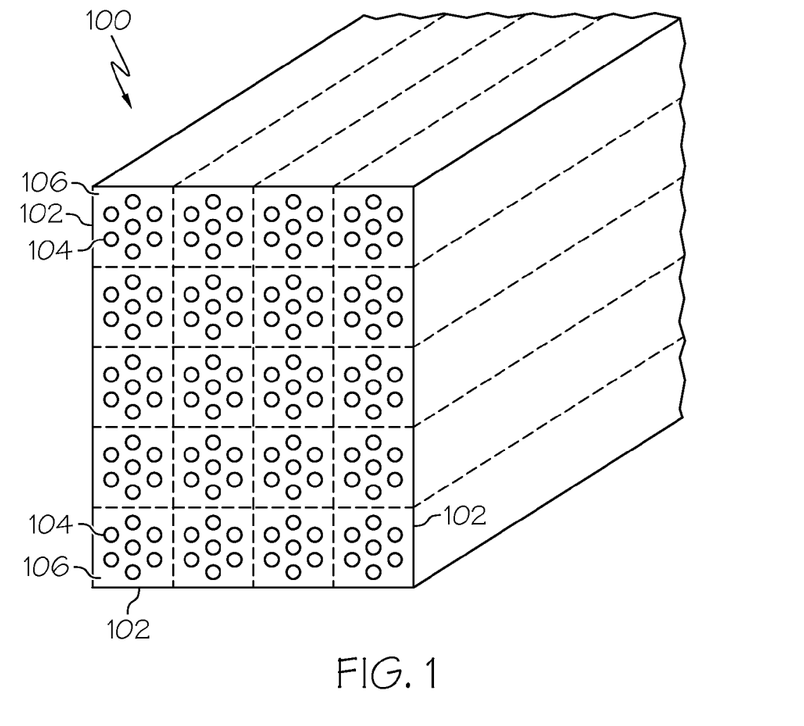
FIG. 1 schematically depicts a portion of a sorbent substrate for $CO_2$ capture in which the substrate comprises a plurality of sorbent filaments bonded together to form the substrate, according to one or more embodiments shown and described herein.

Reference will now be made in detail to embodiments of sorbent substrates for capturing $CO_2$ from a process gas stream and methods for forming the same, examples of which are illustrated in the accompanying drawings. Whenever possible, the same reference numerals will be used throughout the drawings to refer to the same or like parts. One embodiment of a sorbent substrate for capturing $CO_2$ from a process gas stream is schematically depicted in FIG. 1. The sorbent substrate generally includes a plurality of sorbent filaments which are axially aligned and bonded together. Each of the sorbent filaments generally comprises a matrix of sorbent material for capturing $CO_2$ from a process gas stream. A plurality of through-channels are formed in the matrix of sorbent material utilizing a co-extrusion process. The sorbent substrates and methods for forming the sorbent substrates will be described in more detail herein with specific reference to the appended drawings.

Referring now to FIG. 1, one embodiment of a sorbent substrate 100 is schematically depicted. The sorbent substrate 100 may be used to capture $CO_2$ from a process gas stream. The sorbent substrate 100 is constructed from a plurality of individual sorbent filaments 102 which are stacked and bonded together. In the embodiment of the sorbent substrate 100 depicted in FIG. 1, the sorbent filaments 102 are square in cross section. However, it should be understood that, in other embodiments, the sorbent filaments 102 may have other cross sectional shapes including, without limitation, circular, rectangular, hexagonal, triangular, or the like. For example, FIG. 2 schematically depicts a sorbent substrate 100 which is circular in cross section and which is formed from a plurality of individual sorbent filaments 102 which are also circular in cross section.

Figure 2:
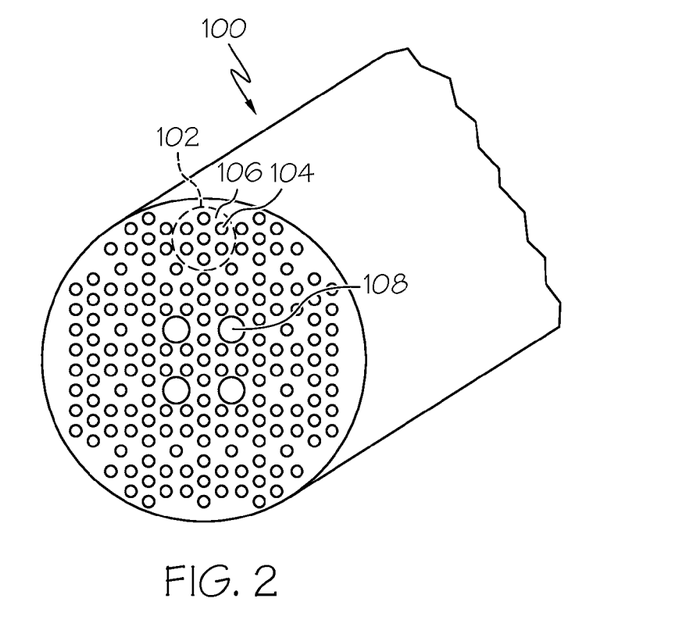
FIG. 2 schematically depicts a portion of another embodiment of a sorbent substrate for $CO_2$ capture in which the substrate comprises a plurality of sorbent filaments bonded together to form the substrate according to one or more embodiments shown and described herein.

Referring now to FIGS. 1 and 2, the sorbent filaments 102 of the sorbent substrate 100 generally comprise a matrix of sorbent material 106 in which a plurality of through-channels 104 are formed. The matrix of sorbent material 106 is formed from a sorbent material suitable for adsorbing $CO_2$ from a process gas stream and may include, without limitation, molecular sieve materials having framework structures such as MFI, MOR, ISV, ITE, CHA, DDR, FAU, and/or LTA framework structures and similar materials. Exemplary materials include, without limitation, ZSM5 zeolite which has an MFI framework structure, and Mordenite which has an MOR framework structure. The sorbent materials may also include sorbents based on activated carbon or carbon molecular sieve materials. Alternatively, the sorbent material may be selected from a metallic organic framework (MOF) family such as MOF-5, MOF-177, MOF-505, MOF-74 or zeolitic imidazole framework structures (ZIFs) including, without limitation, ZIF-68, ZIF-69, ZIF-7, ZIF-9, ZIF-11 and ZIF-90. Suitable sorbent materials may also include any of the aforementioned materials functionalized with an amine or amino group to further enhance the adsorption capacity of the material. Moreover, it should be understood that the sorbent material utilized in the sorbent substrate may comprise various combinations of the aforementioned materials.

In the embodiments of the sorbent substrate 100 described herein, the matrix of sorbent material 106 from which each sorbent filament 102 is formed generally has an open, interconnected porosity P1% which permits a process gas stream to permeate and diffuse through the sorbent substrate 100. For example, in some embodiments, the porosity P1% of the sorbent filaments is such that $20\% \leq P1\% \leq 70\%$. In some other embodiments, the porosity P1% is such that $25\% \leq P1\% \leq 40$. In general, the sorbent filaments and the sorbent substrate are formed with an open porosity which enables a process gas stream containing $CO_2$ to diffuse through the substrate while still permitting intimate contact between the process gas stream and the matrix of sorbent material to facilitate adsorption of the $CO_2$ by the matrix of sorbent material.

Still referring to FIGS. 1 and 2, each of the sorbent filaments 102 of the sorbent substrate 100 are axially aligned with one another. Moreover, the through-channels 104 generally extend through the matrix of sorbent material 106 in an axial direction of the sorbent filament 102 between a first end and a second end. Accordingly, the plurality of through-channels 104 of each sorbent filament 102 are substantially parallel with the plurality of through-channels 104 of each adjacent sorbent filament.

The minimum diameter of the through channels is dependent on the particle size of the sorbent material used in the matrix material. In general, the minimum diameter of the channels is 3× the particle diameter of the sorbent material. In the embodiments of the sorbent substrate 100 described herein, the through-channels 104 of each sorbent filament 102 generally have a diameter d such that $20 \, \mu m \leq d \leq 2000 \, \mu m$. In other embodiments the through-channels 104 may be sized such that $50 \, \mu m \leq d \leq 1000 \, \mu m$. In still other embodiments, the through-channels 104 of the sorbent filaments 102 may be sized such that $75 \, \mu m \leq d \leq 500 \, \mu m$. Similar to the diameter d of the through-channels, the minimum spacing between adjacent channels is dependent on the particle size of the sorbent material used in the matrix material. In general, the minimum spacing attainable is 3× the particle diameter of the sorbent material. In the embodiments described herein, the density of the through-channels may be in a range from about 1 channel per square in (cpsi) (0.155 channels/cm²) up to 150,000 cpsi (23,255 channels/cm²).

As noted above, each sorbent filament 102 of the sorbent substrate 100 is bonded to at least one other sorbent filament. For example, in some embodiments described herein, each sorbent filament 102 is coated with a binding material which binds adjacent sorbent filaments together. In some embodiments, the binding material may be an inorganic material such as alumina, silica, clay, ceria, aluminum phosphate, glass frit, geopolymers or similar inorganic binding materials which have relatively low melting points. Alternatively, the binding material may be an organic binding material such as, for example, phenolic resins.

While the sorbent substrate 100 has been described herein as comprising a binding material which binds the sorbent filaments 102 together, in other embodiments the sorbent substrate 100 may be formed without the use of a binding material. For example, in some embodiments the matrix of sorbent material 106 of each sorbent filament 102 may be utilized to bind the individual sorbent filaments together. For example, as will be described in more detail herein, the matrix of sorbent material 106 of each sorbent filament 102 may contain one or more inorganic binders which binds the sorbent material in each filament together. Accordingly, once the individual sorbent filaments have been assembled into the sorbent substrate, the binder in the sorbent material may be activated, such as by heating or the like, to bind the individual sorbent filaments together.

In some embodiments described herein, the through-channels 104 of the sorbent substrate may further comprise a second sorbent material which is coated on the walls of the through-channels. The second sorbent material may be a metal or metallic oxide material which is suitable for adsorbing $CO_2$ from a process gas stream. Exemplary materials for the second sorbent material include, without limitation, alkali carbonates such as potassium carbonate and sodium carbonate. Exemplary sodium carbonates include Trona and sodium bicarbonate.

Referring now to FIG. 2, in the some embodiments the sorbent substrate 100 may optionally comprise one or more conduits 108 (four depicted in FIG. 2) positioned amongst the sorbent filaments 102. In the embodiment shown in FIG. 2, the conduits 108 are generally axially aligned with the sorbent filaments 102. However, it should be understood that, in other embodiments (not shown) the conduits may be non-parallel with the sorbent filaments 102 and the corresponding through channels 104. The conduits facilitate directing a flow of cooling fluid, such as a liquid or gas, through the sorbent substrate 100 to facilitate cooling the substrate 100 as $CO_2$ is adsorbed into the matrix of sorbent material. Specifically, the reaction between the $CO_2$ in a process gas stream and the sorbent material of the sorbent substrate 100 is generally an exothermic reaction. The heat produced as a result of the reaction generally builds up in the substrate 100 and, under certain conditions, may limit the ability of the substrate to adsorb additional $CO_2$ from a process gas stream. However, cooling fluid directed through the through-channels 104 and/or the conduit 108 draws heat from the matrix of sorbent material and carries the heat away from the sorbent substrate 100, thereby cooling the substrate and improving the ability of the sorbent substrate 100 to adsorb $CO_2$. The conduits 108 provide for a larger flow path than the through-channels 104 and, as such, provide improved thermal management capabilities over the through-channels alone.

In a similar manner, the conduits 108 may also be utilized to direct a heating fluid, such as liquid or gas, through the sorbent substrate 100 to facilitate release of $CO_2$ adsorbed in the matrix of sorbent materials. As noted above, when $CO_2$ is adsorbed into the sorbent material, heat is generated. However, if heat is added to the sorbent material, $CO_2$ is released and the adsorption process is reversed. In some embodiments described herein, heat may be added to the matrix of sorbent material 106 by directing a flow of heating fluid through the through-channels and/or conduits 108 which, in turn, heats the sorbent substrate 100 causing the release of adsorbed $CO_2$ and the regeneration of the sorbent material.

In the embodiments described herein, the conduits 108 may be formed from a material other than the sorbent material. In some embodiments, the conduits 108 are formed from a thermally conductive metal, ceramic or polymeric material. For example, when the conduits are formed from a metallic material, the conduits may be formed from copper or a copper alloy, aluminum or an aluminum alloy, stainless steel, copper-beryllium alloys and/or other thermally conductive materials.

Referring now to FIGS. 1 and 2, the sorbent substrates described herein generally have a voidage V, which is defined as the percentage of open volume (i.e., pores, channels, conduits and the like) within the total volume of the substrate. The sorbent substrates described herein generally have a voidage of less than about 82.5%. In some embodiments, the voidage may be such that $25\% \leq V \leq 75\%$. In other embodiments the voidage may be such that $25\% \leq V \leq 70\%$. Maintaining the voidage in this range improves the efficiency and activity of the substrate for capturing $CO_2$ from a process gas stream. In some embodiments the voidage may be less than 70%.

Methods for forming the sorbent substrates will now be described with specific reference to FIGS. 3-5.

As noted above, the sorbent substrates described herein comprise a plurality of sorbent filaments which are stacked and bonded together to form a substrate having through-channels of the desired dimensions. The dimensions of the through-channels formed in individual sorbent filaments are achieved by forming the individual sorbent filaments by a co-extrusion process which facilitates forming the through-channels and reducing the through-channels and sorbent filaments to the desired cross-sectional size without collapsing the through-channels.

The sorbent filaments of the sorbent substrate are formed by first mixing a batch of plasticized matrix material. The batch of plasticized matrix material comprises the sorbent material, an organic binder, an inorganic binder, processing aids, and a liquid vehicle. As noted hereinabove, the sorbent material comprises a material suitable for adsorbing $CO_2$ from a process gas stream and may include, without limitation, molecular sieve materials having framework structures such as MFI, MOR, ISV, ITE, CHA, DDR, FAU, and/or LTA framework structures and similar materials. Exemplary materials include, without limitation, ZSM5 zeolite which has an MFI framework structure, and Mordenite which has an MOR framework structure. The sorbent materials may also include sorbents based on activated carbon or carbon molecular sieve materials. Alternatively, the sorbent material may be selected from a metallic organic framework (MOF) family such as MOF-5, MOF-177, MOF-505, MOF-74 or zeolitic imidazole framework structures (ZIFs) including, without limitation, ZIF-68, ZIF-69, ZIF-7, ZIF-9, ZIF-11 and ZIF-90. Suitable sorbent materials may also include any of the aforementioned materials functionalized with an amine or amino group to further enhance the adsorption capacity of the material. Moreover, it should be understood that the sorbent material utilized in the sorbent substrate may comprise various combinations of the aforementioned materials.

The sorbent material is provided in a powder form. In some embodiments the sorbent material has an average particle size in the range from about 1 nm to about 1000 nm. In other embodiments, the sorbent material has an average particle size in the range from about 5 nm to about 500 nm. In the embodiments described herein the sorbent material is present in the batch of plasticized matrix material in an amount from about 30 wt. % to about 75 wt. % by weight of the batch. In other embodiments, the batch of plasticized matrix material includes from about 40 wt. % to about 50 wt. % of sorbent material by weight of the batch.

The organic binders included in the plasticized batch of matrix material facilitate extruding the matrix material during formation of the sorbent filaments. Suitable organic binders include, without limitation, water soluble cellulose ether binders such as methylcellulose, hydroxypropyl methylcellulose, methylcellulose derivatives, hydroxyethyl acrylate, polyvinylalcohol, and/or combinations thereof. Preferably, the organic binder is present in the batch as a super addition in an amount in the range of from 0.1 wt. % to about 10.0 wt. % by weight of the sorbent material in the batch. In another embodiment, the organic binder can be present in the composition as a super addition in an amount in the range of from 2.0 wt. % to 8.0 wt. % by weight of the sorbent material in the batch.

The inorganic binders included in the plasticized batch of matrix material facilitate binding the sorbent material following formation of the sorbent filaments by extrusion. In the embodiments described herein, the inorganic binder may be a silicone binding agent such as silicone resins and/or silicone emulsions. These silicone materials can be provided as precursor materials such as, for example, silicone resin or colloidal silica. In some embodiments the inorganic binder is incorporated in the form of a silicone resin or silicone emulsion. Suitable silicone resins include, without limitation, aqueous emulsions of silicone such as Wacker A G SILRES® M 50 E (an emulsion of a methyl silicone resin with reported solids content of 52-55%) or Wacker A G SILRES® M 97 E, both of which are available from Wacker-Chemie GmbH of Munich, Germany. The inorganic binder is incorporated in the batch mixture in an amount ranging from about 5 wt. % to about 50 wt. % by weight of the batch, preferably from about 20 wt. % to about 40 wt. % by weight and, more preferably, from about 20 wt. % to about 35 wt. % by weight of the batch.

The liquid vehicle acts as a solvent for the organic binders and generally provides a flowable or paste-like consistency to the plasticized batch composition of matrix material to facilitate extrusion of the batch. In the embodiments described herein, deionized water is utilized as the liquid vehicle. However, it should be understood that other liquid vehicles exhibiting solvent action with respect to the organic binders may also be used as an alternative to water or in addition to water. The amount of the liquid vehicle in the plasticized batch of matrix material may vary depending on the desired rheology of the batch. In some embodiments, the liquid vehicle is present in the batch as a super addition in an amount from about 1.0 wt. % to 50 wt. % by weight of the batch. In other embodiments, the liquid vehicle is present in the batch as a super addition in an amount from 1.0 wt. % to 20 wt. % by weight of the batch. Minimization of the liquid component in the batch reduces undesired drying shrinkage and crack formation during subsequent drying.

In addition to the sorbent material, liquid vehicle, organic binders, and inorganic binders, the plasticized batch composition may also include one or more optional forming or processing aids such as, for example, a lubricant. Exemplary lubricants include tall oil, sodium stearate, Durasyn 162 (polyphaolefin) or other suitable lubricants and/or combinations thereof. The amount of lubricant present in the plasticized batch mixture may be from about 0.1 wt. % to about 10 wt. % by weight of the batch.

In the embodiments described herein, the plasticized batch of matrix material is formed by first dry mixing the sorbent material and the organic binder. The mixing may be performed utilizing a three axis mixer such as a Turbula mixer. Thereafter, the remaining components of the batch composition (i.e., the inorganic binder, liquid vehicle, and processing aids) are added to the dry mix of sorbent material and organic binder and mixed with a muller to form an extrudable paste (i.e., the plasticized batch composition of matrix material).

To form the sorbent filaments of the sorbent substrates described herein, a plasticized batch of support material is also formed in addition to the plasticized batch of matrix material. The support material is utilized to form and retain the shape of the through-channels in a co-extrusion process with the matrix material. In the embodiments described herein, the plasticized batch of support material generally includes the support material and one or more processing aids such as lubricants or the like. However, it should be understood that the plasticized batch of support material may include other components (e.g., binders, a liquid vehicle, pore formers and the like) depending on the type of support material selected and the desired properties of the support material following formation of the sorbent filaments.

In the embodiments described herein, the support material is ultimately removed from the sorbent filaments and, as such, the support material is a fugitive material. Accordingly, the support material must be capable of being readily removed from the sorbent filaments without damaging the sorbent filaments. In the embodiments described herein, the support material may include heat softenable materials such as natural or synthesized fatty acids, polyalcohols and/or esthers, paraffins, natural or synthetic hydrocarbon waxes, or synthesized thermoplastic polymeric materials. In embodiments where the support material is a wax, the wax may be microcrystalline wax or crystalline wax. For example, suitable wax materials include, without limitation, microcrystalline wax such as Ultraflex wax or Victory wax manufactured by Bareco, Witco W-445 wax or Witco W-835 wax manufactured by Chemtura. Alternatively, the support material may be a material which sublimes upon heating including, without limitation, sulfur or a similar material. The support material is generally present in the plasticized batch of support material in an amount greater than 75 wt. % by weight of the batch. For example, the fugitive material may be present in an amount greater than 80 wt. % or even greater than 90 wt. % by weight of the batch.

Further, in embodiments where the support material is a fugitive material such as wax, the batch of support material may additionally include processing aids such as lubricants. Suitable lubricants include, without limitation, tall oil, graphite, and/or combinations thereof. These processing aids are generally present in the batch composition in an amount which is less than 25 wt. % of the batch. In some embodiments, the processing aids are present in the batch in an amount which is less than 10 wt. % of the batch.

In embodiments where the support material is a wax, the plasticized batch of support material is formed by heating the wax to form molten wax. Thereafter, the processing aids are added to the wax and the batch is mixed and cooled to solidify the batch.

As noted hereinabove, in some embodiments, the through-channels 104 of the substrate may be coated with a second sorbent material, such as a metal or metal oxide. Exemplary materials include, without limitation, alkali carbonates such as potassium carbonate and sodium carbonate. This second sorbent material may be added to the plasticized batch of support material such that, when the support material is removed from the sorbent filaments, a portion of the second sorbent material remains on the walls of the through-channels.

In one embodiment, following formation of the plasticized batch of matrix material and formation of the plasticized batch of matrix material, each batch of material is separately extruded into rods prior to forming the sorbent filaments by co-extruding the matrix material with the support material. For example, in one embodiment, the plasticized batch of matrix material is extruded into cylindrical matrix rods. Similarly, the plasticized batch of support material may be co-extruded into cylindrical channel rods. Separately extruding the plasticized batch of matrix material and the plasticized batch of support material prior to forming the sorbent filaments by co-extrusion improves the homogeneity of the respective batch mixtures.

Figure 3:
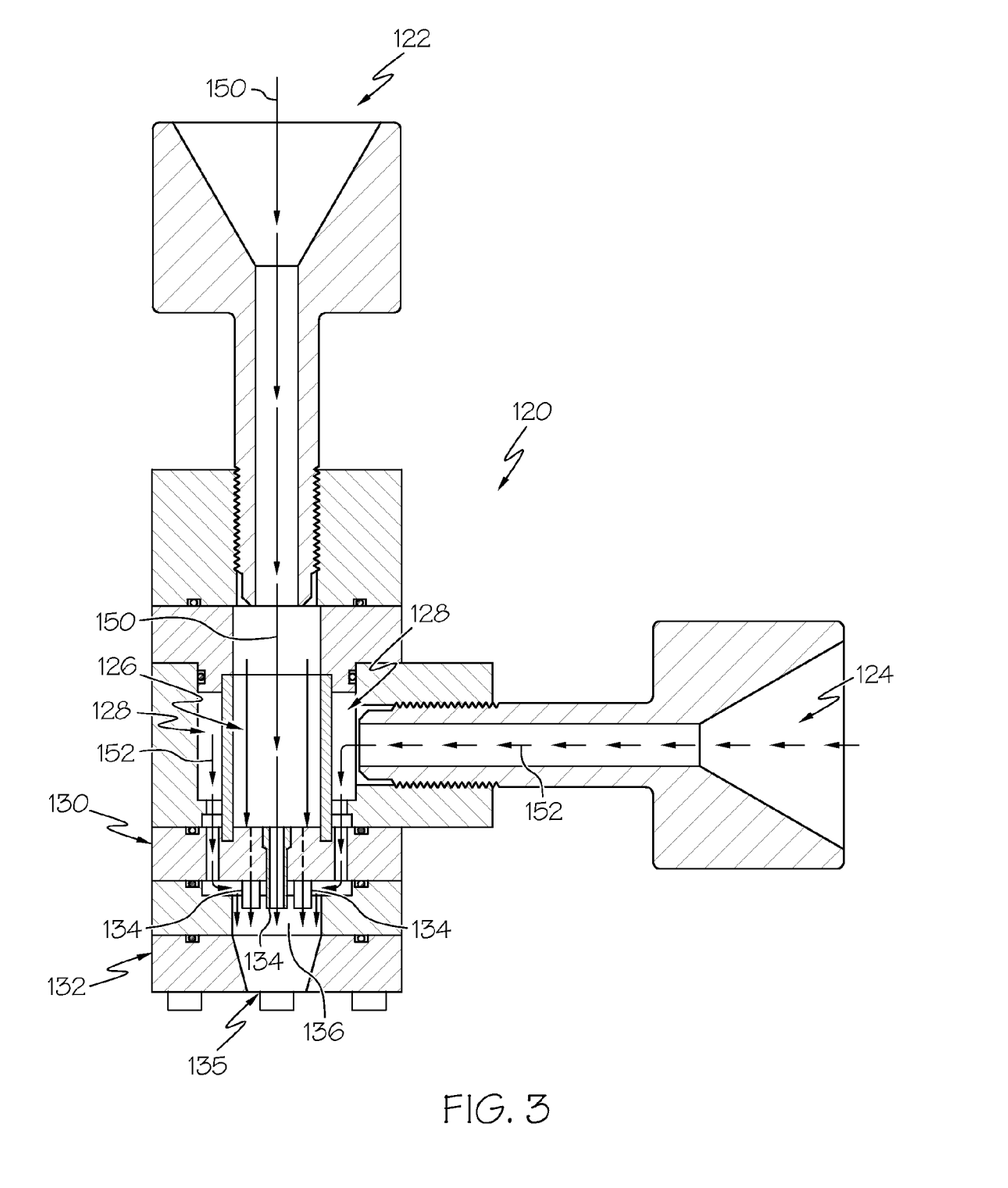
FIG. 3 schematically depicts an extrusion die for forming a sorbent filament having through-channels according to one or more embodiments shown and described herein.

Referring now to FIG. 3, after the plasticized batch of matrix material and the plasticized batch of support material have been formed and optionally extruded into rods, the batch materials are co-extruded to form sorbent filaments comprising a matrix of sorbent material having channels containing support material. In the embodiments described herein, the sorbent filaments are formed using the co-extrusion die 120 schematically depicted in FIG. 3. The co-extrusion die 120 generally comprises a first inlet 122 for receiving the plasticized batch of support material or support rods formed from the support material and a second inlet 124 for receiving the plasticized batch of matrix material or matrix rods formed from the matrix material. In the embodiments described herein, the first inlet 122 and second inlet 124 may be coupled to either ram-type extruders or screw-type extruders which deliver the matrix material and support material to the co-extrusion die 120 under pressure. For example, in embodiments where the plasticized batch of matrix material and the plasticized batch of support material are separately extruded into rods prior to formation of the sorbent filaments, ram-type extruders are utilized to deliver the materials to respective inlets 122, 124. However, in embodiments where the plasticized batch of matrix material and the plasticized batch of support material are not separately extruded into rods prior to formation of the sorbent filaments, either screw-type extruders or ram-type extruders are utilized to deliver the materials to respective inlets 122, 124.

A flow 150 of support material enters the co-extrusion die 120 at inlet 122 and flows into the inner chamber 126 of the co-extrusion die 120 under pressure. Simultaneously, a flow 152 of matrix material enters the co-extrusion die 120 at inlet 124 and flows into outer chamber 128 under pressure. The inner chamber 126 and outer chamber 128 are separated by a wall which prevents the flow 150 of support material from mixing with the flow 152 of matrix material. The extrusion pressure applied to the flow 150 of support material forces the support material through the nozzles 134 of forming die 130, thereby re-shaping the flow 150 of support material into a plurality of individual rods which exit the forming die 130 into forming chamber 136. At the same time, the extrusion pressure applied to the flow 152 of matrix material forces the matrix material around the nozzles 134 of the forming die 130 and into the forming chamber 136. As the matrix material enters the forming chamber 136, the matrix material is compressed around the nozzles 134 of the forming die 130, thereby enveloping the rods of support material exiting the nozzles 134 and forming a bi-component extrudate comprising channels of support material in a matrix of sorbent material.

Thereafter, continued extrusion pressure on both the flow 150 of support material and the flow 152 of matrix material forces the bi-component extrudate into the conical reducing die 132 which reduces the overall diameter of the bi-component extrudate as well as the diameter of the rods of support material contained in the bi-component extrudate, thereby forming a sorbent filament which exits the reducing die 132 at outlet 135.

Figure 4A:
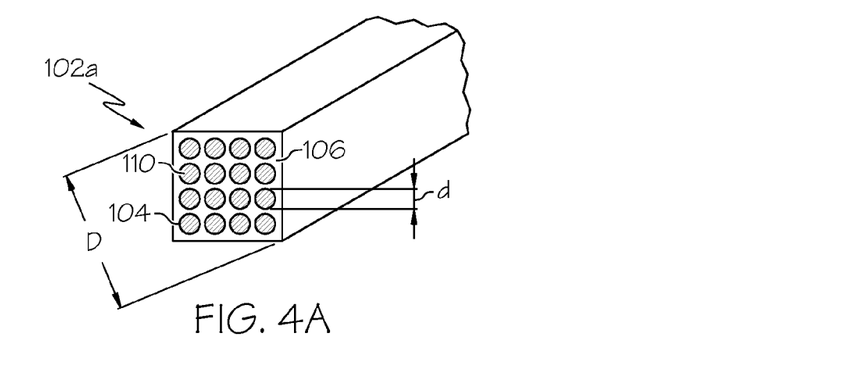
FIGS. 4A-4C schematically depict sorbent filaments with different cross sectional shapes according to one or more embodiments shown and described herein.
Figure 4B:
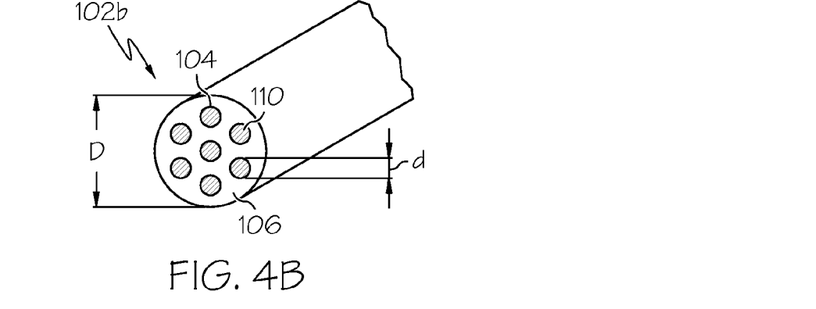
Figure 4C:
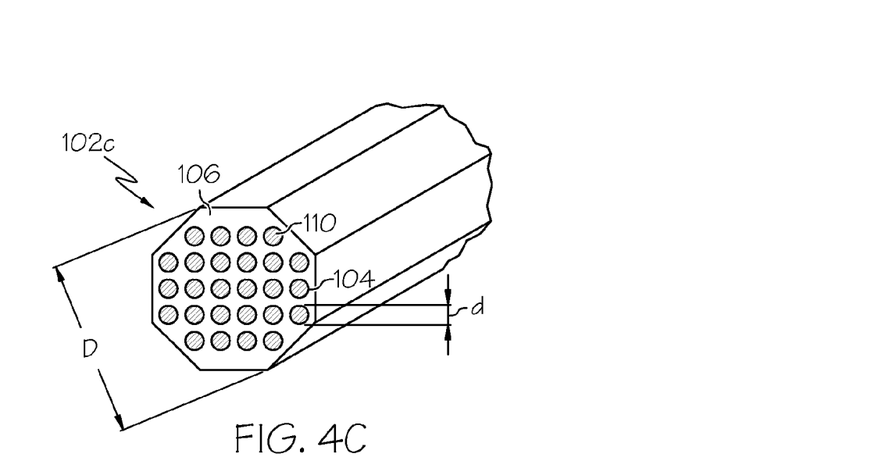

Referring now to FIGS. 4A-4C, exemplary sorbent filaments formed using the co-extrusion die depicted in FIG. 3 are schematically depicted. Specifically, FIG. 4A schematically depicts one embodiment of a sorbent filament 102a having a square cross section, FIG. 4B schematically depicts a second embodiment of a sorbent filament 102b having a circular cross section, and FIG. 4C schematically depicts a third embodiment of a sorbent filament 102c having an octagonal cross section. Each of the sorbent filaments comprises a matrix of sorbent material 106 in which a plurality of through-channels 104 are formed, as described above. In the embodiments of the sorbent filaments 102a, 102b, 102c depicted in FIGS. 4A-4C, the through-channels 104 contain support material 110. The cross sectional shape of the sorbent filaments is dictated by the cross sectional shape of the reducing die 132 (FIG. 3). Accordingly, it should be understood that sorbent filaments with various cross sectional shapes may be formed by using reducing dies having the desired cross sections.

Further, the dimensions of the sorbent filaments (i.e., the maximum outer diameter D of the sorbent filament and the diameter d of the through-channels) are also controlled by the geometry of the reducing die utilized to form the sorbent filaments, the flow behavior of the binders contained in the material, the maximum pressure of the extruder(s) and the particle size of the sorbent material. In some embodiments described herein, the maximum outer diameter D of the sorbent filaments (i.e., the maximum distance between two points on the perimeter of the filament) may be as small as 21× the particle size of the sorbent material. However, in other embodiments described herein, the sorbent filaments have a maximum outer diameter D such that $1\ mm \leq D \leq 50\ mm$, while in other embodiments the maximum outer diameter D of the sorbent filament is such that $2\ mm \leq D \leq 15\ mm$.

Moreover, it should be understood that the number and diameter d of the through-channels 104 formed in each sorbent filament is dependent on the number and size of the nozzles in the forming die 130 (FIG. 3). For example, it is contemplated that as many as 2200 through-channels having a diameter d in the order of tens of microns may be formed in a sorbent filament having a maximum diameter D of approximately 33 mm (i.e., a sorbent filament with a 2.4 mm×2.4 mm square cross section).

In one embodiment, after the sorbent filaments are formed by co-extruding the plasticized batch of matrix material with the plasticized batch of sorbent material, the sorbent filaments may be optionally coated with a binding material to facilitate binding the individual sorbent filaments together in a subsequent stacking step. The binding material may be an inorganic binding material such as alumina, silica, clay, ceria, aluminum phosphate, glass frit, geopolymers or similar inorganic binding materials which have relatively low melting points. Alternatively, the binding material may be an organic binding material such as, for example, phenolic resins. The minimum thickness of the coating of binding material is generally 3× the particle size of the binding material. In one embodiment, the binding material comprises alumina having a particle size of 70 μm which is applied to the filaments in a colloidal suspension such that each sorbent filament comprises an alumina coating having a thickness of at least 210 μm.

Figure 5:
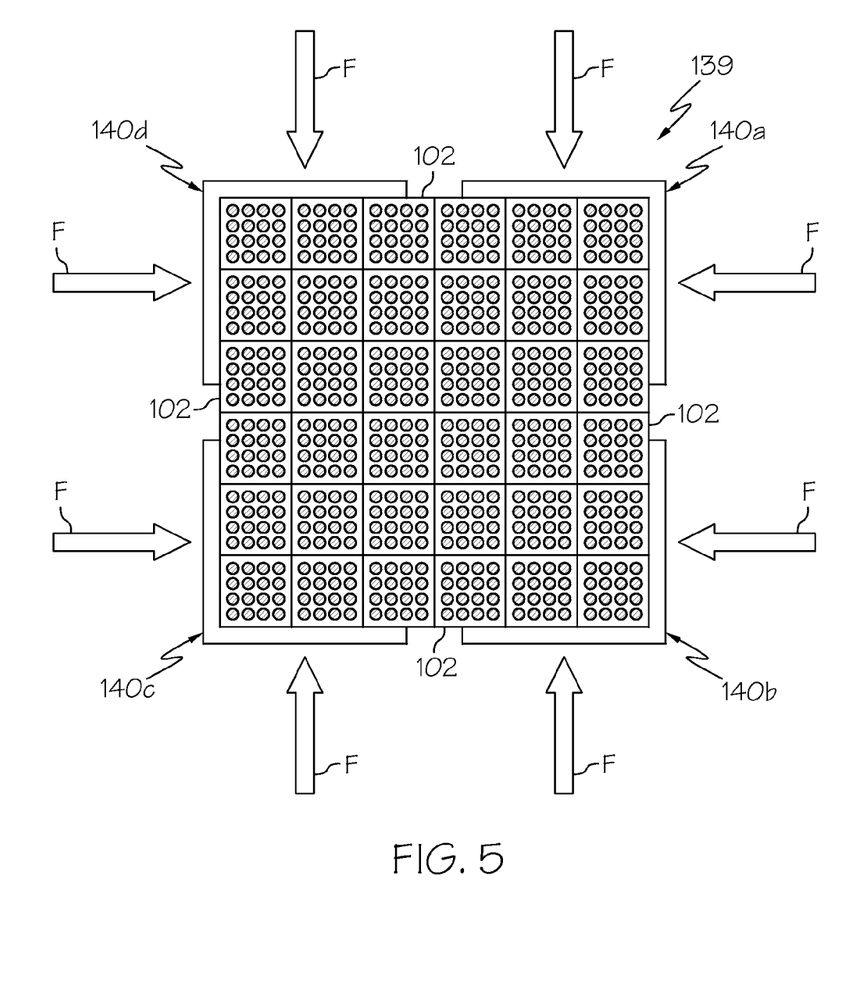
FIG. 5 schematically depicts a filament assembly of a sorbent substrate being radially compacted according to one or more embodiments shown and described herein.

Referring now to FIG. 5, after the sorbent filaments 102 have been formed and optionally coated with a binding material, the filaments are stacked and axially aligned in a segmented frame 139 to form a filament assembly. The segmented frame is shaped to correspond to the desired shape of the resultant sorbent substrate. For example, in the embodiment shown in FIG. 5, the sorbent filaments 102 are stacked in a square segmented frame 139 to form a filament assembly which may be used to produce a sorbent substrate which has a square cross section as depicted in FIG. 1. However, it should be understood that frames of different geometrical configurations may be utilized. For example, in one embodiment the frame may be cylindrical in shape and comprise a plurality of semi-cylindrical segments. In the embodiment of the segmented frame 139 depicted in FIG. 5, the segmented frame 139 generally comprises a first segment 140a, a second segment 140b, a third segment 140c and a fourth segment 140d, each of which may be individually positioned with respect to the sorbent filaments. In embodiments where conduits are included in the sorbent substrate, the conduits may be stacked in the segmented frame amongst the sorbent filaments and axially aligned with the sorbent filaments.

Once the sorbent filaments and any conduits are stacked in the segmented frame 139 and axially aligned, a radial compaction force F is applied to each of the segments 140a, 140b, 140c, 140d of the frame to compress the frame and shape the sorbent filaments 102 into a filament assembly having the desired shape. In embodiments where the sorbent filaments are round or have a geometrical configuration which produces interstitial spaces between the sorbent filaments when the filaments are stacked, the compaction force F applied to the segmented frame may be sufficient to remove the interstitial spaces between the sorbent filaments 102. The compaction force F may be applied to the segmented frame 139 with mechanical clamps (not shown), such as band clamps or the like such that the segmented frame 139 and the sorbent filaments 102 contained therein are isostatically compressed. Alternatively, the compaction force may be applied to the segmented frame with one or more hydraulic rams. The support material contained in the through-channels of the sorbent filament prevents the through-channels from collapsing during the compaction process. In some embodiments, the filaments and the frame may be placed under vacuum prior to and during application of the compaction force F to improve knitting between adjacent sorbent filaments 102.

Thereafter, the filament assembly comprising the compacted sorbent filaments is dried to remove water from the assembly. For example, the filament assembly may be dried by placing the filament assembly in an oven and heating the filament assembly to a drying temperature $T_d$ and holding the assembly at this temperature for a predetermined amount of time. In some embodiments, the drying temperature $T_d$ may be in a range from about 90° C. to about 150° C. In these embodiments the drying time may be approximately twelve hours.

In some embodiments, the melting or sublimation temperature of the support material positioned in the through-channels may be within the drying temperature range. In these embodiments, the support material may begin to melt and drain from the assembly during drying. As such, the filament assembly may be positioned at an angle during drying to facilitate draining the melted support material from the filament assembly.

In other embodiments, the support material may have a melting temperature which is greater than the drying temperature $T_d$. In these embodiments a separate step of heating the filament assembly to a temperature in excess of the melting temperature of the support material may be utilized to remove the support material from the through-channels after the assembly has been dried. In yet another embodiment, the support material may be removed from the filament assembly during a separate bonding step. In some embodiments, the dried assembly is placed under vacuum and heated to a temperature suitable to vacuum pyrolize the support material.

After the filament assembly is dried, the filament assembly is removed from the frame and heated to bind the matrix material with the inorganic binder and bond the plurality of sorbent filaments to one another with the binding material, and thereby form the sorbent substrate. In the embodiments of the sorbent substrate described herein, the substrate is heated to a temperature sufficient to bind the matrix material with the inorganic binder contained in the matrix material and simultaneously bind the individual filaments to one another. For example, in embodiments where the inorganic binder is silica or a silicone emulsion, the filament assembly may be heated to a temperature T such that $250° C. \leq T \leq 800° C.$ This temperature range is also suitable for binding the filaments together with the binding material. In embodiments where the inorganic binder is a silicone emulsion, the filament substrate may be heated to and held at a temperature which is sufficient to either partially or fully oxidize the silicone of the emulsion to silica. For example, the filament assembly may be heated to a temperature of in greater than about 500° C., for example, from about 500° C. to about 700° C., and held for three hours to reduce substantially all of the silicone to silica and thereby bind the sorbent material. Alternatively, the filament assembly may be heated to a temperature of 250° C. and held for three hours to cross link the silicone and thereby bind the sorbent material.

EXAMPLES

The methods for forming the sorbent substrate described herein will be further clarified with reference to the following example.

Example 1

A plasticized batch of matrix material was formed from CBF 3024E ZSM-5 zeolite manufactured by Zeolyst, M97E silicone emulsion manufactured by Wacker-Chemie GmbH, Culminal 724 hydroxypropyl methylcellulose binder manufactured by Hercules Incorporated, Durasyn 162 lubricant manufactured by Ineos Group Ltd., tall oil manufactured by MeadWestvaco, and deionized water. Specifically, the zeolite and the hydroxypropyl methylcellulose binder were dry mixed in a Nalgene container with a three-axis mixer. The remaining components (i.e., the silicone emulsion, lubricant, tall oil and deionized water) were blended into the dry powder mixture using a wheel and plow muller to form an extrudable plasticized batch of matrix material. The resultant batch comprised 56.8 wt. % zeolite as the sorbent material, 34.1 wt. % silicone emulsion as the inorganic binder, 3.4 wt. % hydroxypropyl methylcellulose as the organic binder, 1.1 wt. % Durasyn 162 lubricant, 0.6 wt. % tall oil lubricant, and 4.0 wt. % deionized water as the liquid vehicle.

A plasticized batch of support material was also formed from Ultraflex micro crystalline wax manufactured by Bareco, tall oil manufactured by MeadWestvaco and Micro 450 graphite lubricant manufactured by Asbury Carbons. Specifically, the wax was melted and mixed with the tall oil and the graphite was subsequently added to the mixture. Thereafter the mixture was cooled and solidified. The resultant plasticized batch of support material comprised 90.9 wt. % wax as the support material, 6.4 wt. % tall oil as a lubricant and 2.7 wt. % graphite as a lubricant.

The plasticized batch of matrix material was extruded into 10 millimeter matrix rods and the plasticized batch of support material was extruded into 10 millimeter channel rods. The matrix rods and the channel rods were fed into the co-extrusion die depicted in FIG. 3 with ram extruders to produce a plurality of 2 mm diameter sorbent filaments of circular cross section and having seven 150 μm diameter through-channels extending through the filament in an axial direction filled with support material.

The plurality of sorbent filaments were coated with an alumina slurry having a particle size of 70 μm to form a 210 μm thick alumina coating around each sorbent filament. The sorbent filaments were then stacked and axially aligned in a cylindrical, two-piece segmented frame and compressed with band clamps wrapped around the cylindrical frame to form a circular filament assembly having a diameter of 101.6 mm. The filament assembly was dried at a temperature of 90° C. for 12 hours in a convection oven while the assembly was inclined at an angle of 25 degrees to allow the support material to drain from the through-channels.

Thereafter, the filament assembly was removed from the segmented frame and heated to a temperature of 700° C. and held at that temperature for 3 hours to bind the adjacent sorbent filaments together and to bind the matrix of sorbent material of each sorbent filament, thereby creating a sorbent substrate having a diameter of 101.6 mm, a length of 91 cm and comprising a plurality of 150 μm diameter through-channels.

Figure 6:
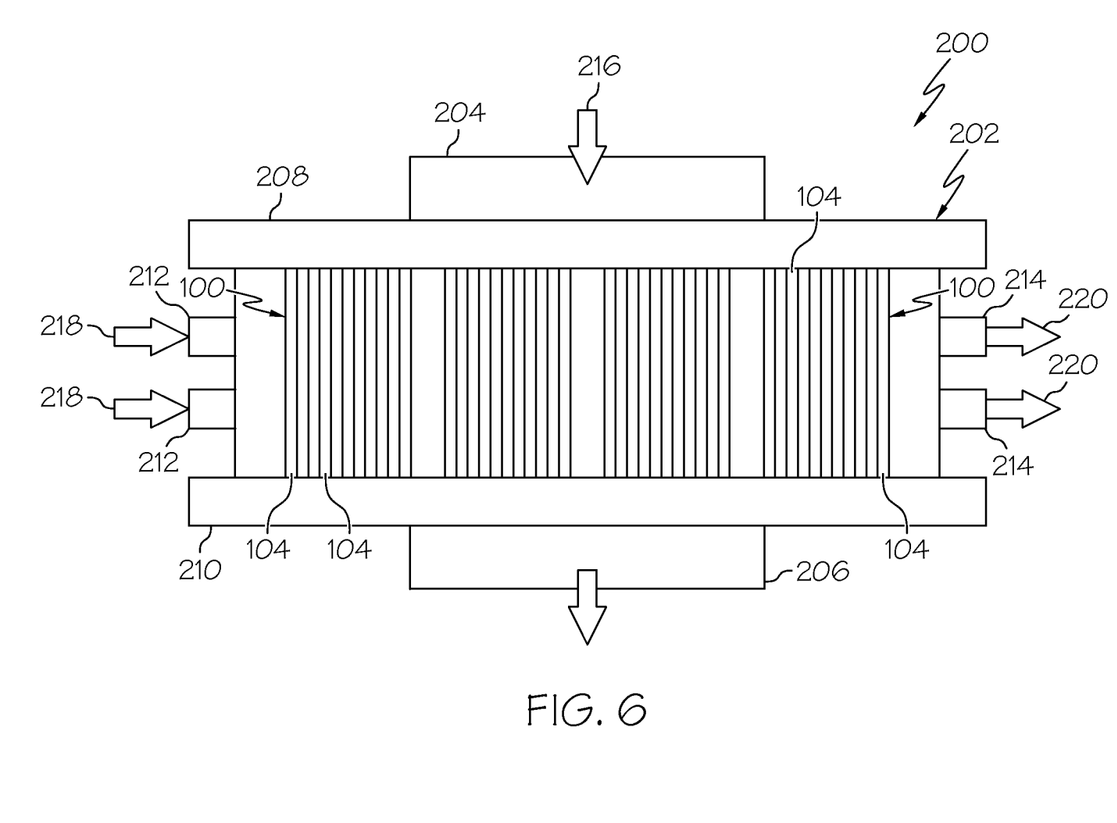
FIG. 6 schematically depicts an apparatus for removing $CO_2$ from a fluid stream according to one or more embodiments shown and described herein.

Referring now to FIG. 6, the sorbent substrates described herein may be used in a $CO_2$ recovery unit such as the $CO_2$ recovery unit depicted in FIG. 6. Specifically, the sorbent substrates 100 are positioned in a pressure vessel 202 of the $CO_2$ recovery unit 200 which includes a process gas inlet 212, a process gas outlet 214, a control fluid inlet 204 coupled to a control fluid inlet manifold 208, and a control fluid outlet 206 coupled to a control fluid outlet manifold 210. The sorbent substrates 100 are positioned in the interior of the pressure vessel 202 and the through-channels 104 of the sorbent substrate are fluidly coupled to the control fluid inlet manifold 208 at one end of the substrate and to the control fluid outlet manifold 210 at the opposite end of the substrate.

In operation, $CO_2$ can be removed from a process gas stream 218 by coupling the process gas stream 218 into the $CO_2$ recovery unit 200 through the process gas inlet 212. As the process gas stream 218 permeates into and diffuses through the pores of the sorbent substrates 100, the $CO_2$ in the process gas stream 218 is adsorbed by the sorbent material and the process gas stream exits the pressure vessel 202 through the process gas outlet 214 as a $CO_2$-free process gas stream 220. The adsorption of the $CO_2$ by the sorbent material produces heat. Accordingly, at the same time the process gas flows through the pressure vessel 202, a control fluid 216, specifically a cooling fluid such as nitrogen gas or water, is introduced into the control fluid inlet 204 such that the control fluid 216 flows through the control fluid inlet manifold 208, into the through-channels 104 of the sorbent substrates 100, and exits the $CO_2$ recovery system through the control fluid outlet manifold 210 and control fluid outlet 206, thereby dissipating the heat produced by the adsorption of the $CO_2$ by the sorbent substrates 100.

Over time, the sorbent substrates 100 become saturated with $CO_2$ and require regeneration. To regenerate the sorbent substrates, a control fluid 216, specifically a heated gas or vapor such as steam, or a heated liquid such as water, is introduced into the control fluid inlet 204 such that the control fluid 216 flows through the control fluid inlet manifold 208, into the through-channels 104 of the sorbent substrates 100, and exits the $CO_2$ recovery system through the control fluid outlet manifold 210 and control fluid outlet 206. The heated control fluid supplies thermal energy to the sorbent substrates which causes the desorption of the $CO_2$ from the sorbent material of the sorbent substrates. At the same time, a purge gas, such as nitrogen, is introduced into the pressure vessel 202 through the process gas inlet 212. The purge gas permeates into and diffuses through the porous sorbent material of the sorbent substrates, flushing the $CO_2$ released from the sorbent material and carrying the $CO_2$ out of the pressure vessel 202 through the process gas outlet 220.

Figure 7:
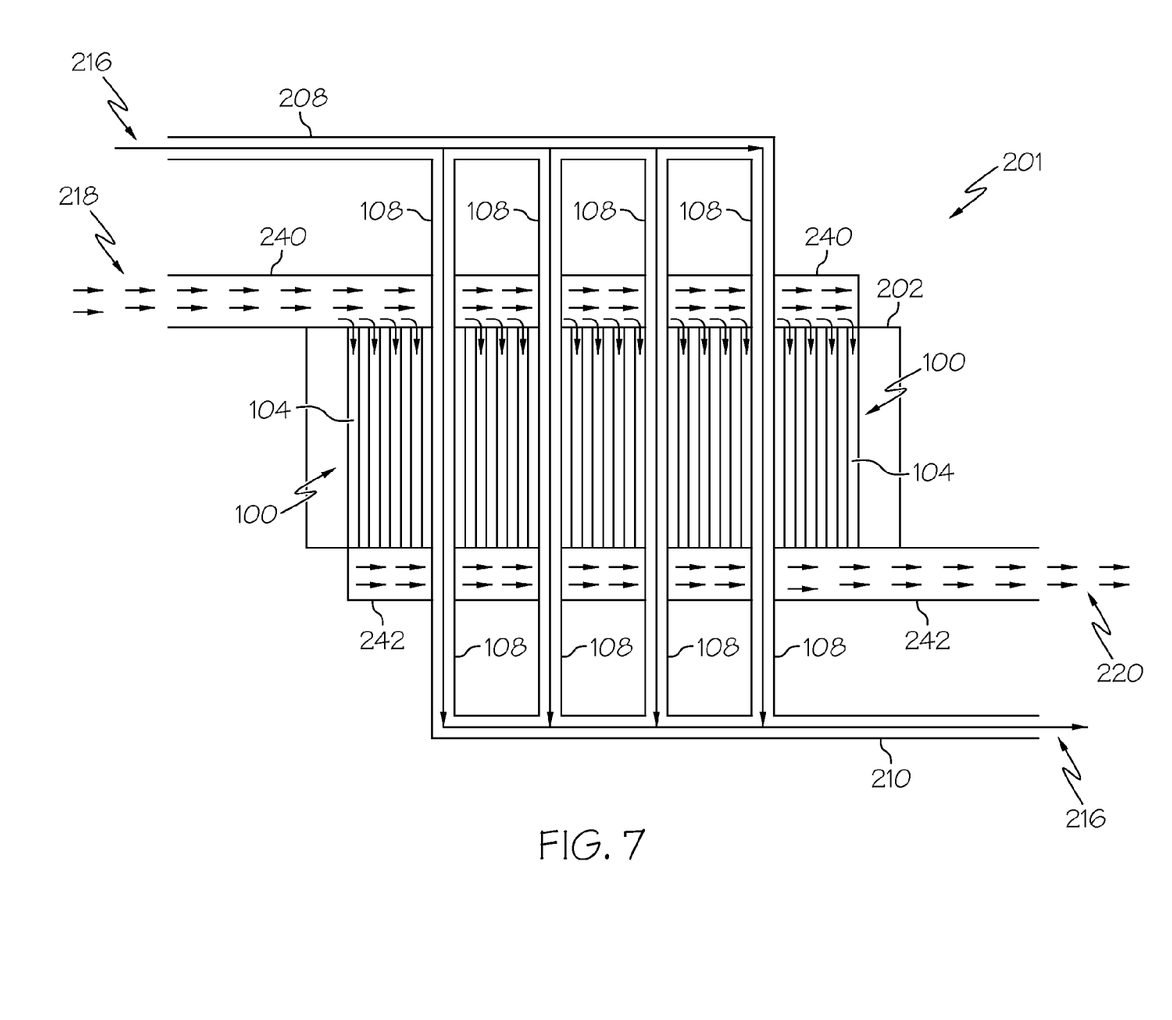
FIG. 7 schematically depicts an alternate embodiment of an apparatus for removing $CO_2$ from a fluid stream according to one or more embodiments shown and described herein.

Referring now to FIG. 7, the sorbent substrates described herein may also be used in $CO_2$ recovery units with alternate configurations, such as the $CO_2$ recovery unit 201 depicted in FIG. 7. Specifically, sorbent substrates 100 with through-channels 104 and conduits 108 are positioned in a pressure vessel 202 of the $CO_2$ recovery unit 201. A process gas inlet manifold 240 and a process gas outlet manifold 242 are fluidly coupled to the pressure vessel 202 and to the through channels 104 of the sorbent substrates 100 such that a process gas stream 218 flowing through the process gas inlet manifold 240 passes through the through-channels 104 and exits the $CO_2$ recovery unit 201 through the process gas outlet manifold 242 as a $CO_2$-free gas. A control fluid inlet manifold 208 and a control fluid outlet manifold 210 are fluidly coupled to the conduits 108 extending through the sorbent substrates 100 but fluidly isolated from the sorbent material and flow-through channels 104 of the sorbent substrates 100. Control fluid 216 passing though the control fluid inlet manifold 208 passes through the conduits and exits the $CO_2$ recovery unit 201 through the control fluid outlet manifold 210.

In operation, $CO_2$ can be removed from a process gas stream 218 by coupling the process gas stream 218 into the $CO_2$ recovery unit 201 through the process gas inlet manifold 240. As the process gas stream 218 travels through the through-channels 104 of the sorbent substrate 100, the $CO_2$ in the process gas stream 218 is adsorbed by the sorbent material and the process gas stream exits the pressure vessel 202 through the process gas outlet manifold 242 as a $CO_2$-free process gas stream 220. The adsorption of the $CO_2$ by the sorbent material produces heat. Accordingly, at the same time the process gas flows through the pressure vessel 202, a control fluid 216, specifically a cooling fluid such as nitrogen gas or water, is introduced into the control fluid inlet manifold 208, passes through the conduits 108, and exits the $CO_2$ recovery system through the control fluid outlet manifold 210 thereby dissipating the heat produced by the adsorption of the $CO_2$ by the sorbent substrates 100.

Over time, the sorbent substrates 100 become saturated with $CO_2$ and require regeneration. To regenerate the sorbent substrates, a control fluid 216, specifically a heated gas or vapor such as steam, or a heated liquid such as water, is introduced into the control fluid inlet manifold 208, into the through-channels 104 of the sorbent substrates 100, and exits the $CO_2$ recovery system through the control fluid outlet manifold 210. The heated control fluid supplies thermal energy to the sorbent substrates which causes the desorption of the $CO_2$ from the sorbent material of the sorbent substrates. At the same time, a purge gas, such as nitrogen, is introduced into the pressure vessel 202 through the process gas inlet manifold 240. The purge gas flushes the $CO_2$ released from the sorbent material out of the sorbent substrates 100 thereby carrying the $CO_2$ out of the pressure vessel 202 through the process gas outlet manifold 242.

It should now be understood that the methods described herein may be utilized to form a sorbent substrate from a plurality of sorbent filaments such that the sorbent substrate is suitable for use in removing $CO_2$ from a process gas stream. Specifically, forming the individual sorbent filaments by co-extruding sorbent material with a support material facilitates forming each of the sorbent filaments with a plurality of through-channels without the through-channels collapsing during the extrusion process or during subsequent assembly of the sorbent substrate. As a result, the sorbent substrates constructed from the sorbent filaments have a high density of through-channels, which may be used to efficiently cool the sorbent substrate as $CO_2$ is adsorbed by the sorbent material of the sorbent filaments and to efficiently heat the sorbent substrate during subsequent regeneration of the sorbent substrate to remove the $CO_2$ captured in the sorbent material of the substrate.

In a first aspect, the disclosure provides a method for forming a sorbent substrate (100) for $CO_2$ capture, the method comprising: forming a plurality of matrix rods from a sorbent material (106) for adsorbing $CO_2$ from a gas stream; forming a plurality of channel rods from a support material; co-extruding the plurality of matrix rods with the plurality of channel rods to form a plurality of sorbent filaments (102) comprising a matrix of the sorbent material (106) comprising channels (104) of support material (110), the channels (104) of support material (110) extending in an axial direction of each of the plurality of sorbent filaments (102); stacking the plurality of sorbent filaments (102) to form a filament assembly, wherein the plurality of sorbent filaments (102) are axially aligned in the filament assembly; and bonding the plurality of sorbent filaments (102) of the filament assembly to one another to form the sorbent substrate (100).

In a second aspect, the disclosure provides a method for forming a sorbent substrate (100) for $CO_2$ capture, the method comprising: forming a plasticized batch of matrix material comprising a sorbent material (106) for adsorbing $CO_2$ from a process gas stream; forming a plasticized batch of fugitive material; co-extruding the plasticized batch of matrix material with the plasticized batch of fugitive material to form a plurality of sorbent filaments (102) comprising a matrix of the sorbent material (106) having channels (104) of fugitive material extending in an axial direction of each of the plurality of sorbent filaments (102); stacking the plurality of sorbent filaments (102) to form a filament assembly, wherein the plurality of sorbent filaments (102) are axially aligned in the filament assembly; compressing the filament assembly; removing the fugitive material from the filament assembly to form a plurality of through-channels (104) in each of the plurality of sorbent filaments (102); and heating the filament assembly to bond the plurality of sorbent filaments (102) to one another to form the sorbent substrate (100).

In a third aspect, the disclosure provides the method of the first aspect, wherein the support material (110) is a fugitive material; and the method further comprises removing the fugitive material from the plurality of sorbent filaments (102) thereby forming through-channels (104) in the plurality of sorbent filaments (102).

In a fourth aspect, the disclosure provides the method of any of any of the first through third aspects, further comprising coating the plurality of sorbent filaments (102) with a binding material prior to stacking the plurality of sorbent filaments (102) to form the filament assembly.

In a fifth aspect, the disclosure provides the method of the fourth aspect, wherein the binding material comprises a slurry of alumina powder.

In a sixth aspect, the disclosure provides the method of any of the first aspect or the third through fifth aspects, further comprising radially compacting the filament assembly.

In a seventh aspect, the disclosure provides the method of any of the first aspect and the third through sixth aspects, wherein the plurality of sorbent filaments (102) are bonded to one another by heating the filament assembly.

In an eighth aspect, the disclosure provides the method of the seventh aspect, wherein the filament assembly is heated to a temperature T in a range such that $250° C. \leq T \leq 850° C$.

In a ninth aspect, the disclosure provides the method of any of the first through eighth aspects, wherein the matrix of the sorbent material (106) has a first porosity P1% such that $20\% \leq P1\% \leq 70\%$.

In a tenth aspect, the disclosure provides the method of any of the first through ninth aspects, wherein the sorbent substrate (100) has a voidage V such that $25\% \leq V \leq 75\%$.

In an eleventh aspect, the disclosure provides the method of any of the first through tenth aspects, further comprising stacking one or more conduits (108) with the plurality of sorbent filaments (102) to form the filament assembly.

In a twelfth aspect, the disclosure provides the method of any of the first through eleventh aspects, further comprising drying the filament assembly prior to bonding the plurality of sorbent filaments (102) to one another.

In a thirteenth aspect, the disclosure provides the method of the twelfth aspect, wherein the filament assembly is dried by heating the filament assembly to a drying temperature $T_d$, wherein $90° C. \leq T_d \leq 150° C$.

In a fourteenth aspect, the disclosure provides the method of any of the first through tenth aspects and the twelfth through thirteenth aspects, further comprising positioning at least one conduit (108) amongst the plurality of sorbent filaments (102) as the plurality of sorbent filaments (102) are stacked, wherein the at least one conduit (108) is formed from a material other than the sorbent material (106).

In a fifteenth aspect, the disclosure provides the method of any of the second through fourteenth aspects, wherein the plasticized batch of matrix material comprises from about 30 wt. % to about 75 wt. % of sorbent material (106); from about 20 wt. % to about 40 wt. % of inorganic binder; and from about 1 wt. % to about 10 wt. % organic binder.

In a sixteenth aspect, the disclosure provides the method of any of the first through fifteenth aspects, wherein each of the plurality of through-channels (104) has a diameter d such that $20 \mu m \leq d \leq 2000 \mu m$.

In a seventeenth aspect, the disclosure provides a sorbent substrate (100) for $CO_2$ capture, the sorbent substrate (100) comprising: a plurality of sorbent filaments (102), each sorbent filament (102) of the plurality of sorbent filaments (102) comprising a matrix of sorbent material (106) in which a plurality of through-channels (104) are formed such that the plurality of through-channels (104) extend through the matrix of sorbent material (106) from a first end of each sorbent filament (102) to a second end of each sorbent filament (102) in an axial direction of each sorbent filament (102), wherein: the sorbent material (106) is capable of adsorbing $CO_2$ from a gas stream; the plurality of sorbent filaments (102) are axially aligned with one another such that the plurality of through-channels (104) of the plurality of sorbent filaments (102) are substantially parallel with one another; and each sorbent filament (102) of the plurality of sorbent filaments (102) is bonded to at least one other sorbent filament.

In an eighteenth aspect, the disclosure provides a sorbent substrate (100) of the seventeenth aspect, further comprising at least one conduit (108) axially aligned with the plurality of sorbent filaments (102), wherein the at least one conduit (108) is formed from a material other than the sorbent material (106).

In nineteenth aspect, the disclosure provides a sorbent substrate (100) of any of the seventeenth aspect or the eighteenth aspect, wherein the sorbent substrate (100) has a porosity P1% such that 20%≤P1%≤70%.

In a twentieth aspect, the disclosure provides a sorbent substrate (100) of any of the seventeenth through nineteenth aspects, wherein the sorbent substrate (100) has a voidage V such that 25%≤V≤75%.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for forming a sorbent substrate for $CO_2$ capture, the method comprising:
    forming a plurality of matrix rods from a sorbent material for adsorbing $CO_2$ from a gas stream;
    forming a plurality of channel rods from a support material;
    co-extruding the plurality of matrix rods with the plurality of channel rods to form a plurality of sorbent filaments comprising a matrix of the sorbent material comprising channels of support material, the channels of support material extending in an axial direction of each of the plurality of sorbent filaments;
    stacking the plurality of sorbent filaments to form a filament assembly, wherein the plurality of sorbent filaments are axially aligned in the filament assembly; and
    bonding the plurality of sorbent filaments of the filament assembly to one another to form the sorbent substrate.

2. The method of claim 1, wherein:
    the support material is a fugitive material; and
    the method further comprises removing the fugitive material from the plurality of sorbent filaments thereby forming through-channels in the plurality of sorbent filaments.

3. The method of claim 1, further comprising coating the plurality of sorbent filaments with a binding material prior to stacking the plurality of sorbent filaments to form the filament assembly.

4. The method of claim 1, further comprising radially compacting the filament assembly.

5. The method of claim 1, wherein the plurality of sorbent filaments are bonded to one another by heating the filament assembly.

6. The method of claim 1, wherein the matrix of the sorbent material has a first porosity P1% such that 20%≤P1%≤70%.

7. The method of claim 1, wherein the sorbent substrate has a voidage V such that 25%≤V≤75%.

8. The method of claim 1, further comprising stacking one or more conduits with the plurality of sorbent filaments to form the filament assembly.

9. The method of claim 1, further comprising drying the filament assembly prior to bonding the plurality of sorbent filaments to one another.

10. A method for forming a sorbent substrate for $CO_2$ capture, the method comprising:
    forming a plasticized batch of matrix material comprising a sorbent material for adsorbing $CO_2$ from a process gas stream;
    forming a plasticized batch of fugitive material;
    co-extruding the plasticized batch of matrix material with the plasticized batch of fugitive material to form a plurality of sorbent filaments comprising a matrix of the sorbent material having channels of fugitive material extending in an axial direction of each of the plurality of sorbent filaments;
    stacking the plurality of sorbent filaments to form a filament assembly, wherein the plurality of sorbent filaments are axially aligned in the filament assembly;
    compressing the filament assembly;
    removing the fugitive material from the filament assembly to form a plurality of through-channels in each of the plurality of sorbent filaments; and
    heating the filament assembly to bond the plurality of sorbent filaments to one another to form the sorbent substrate.

11. The method of claim 10, further comprising coating the plurality of sorbent filaments with a binding material prior to stacking the plurality of sorbent filaments to form the filament assembly.

12. The method of claim 10, further comprising drying the filament assembly prior to bonding the plurality of sorbent filaments.

13. The method of claim 10, further comprising positioning at least one conduit amongst the plurality of sorbent filaments as the plurality of sorbent filaments are stacked, wherein the at least one conduit is formed from a material other than the sorbent material.

14. The method of claim 10, wherein the plasticized batch of matrix material comprises:
    from about 30 wt. % to about 75 wt. % of sorbent material;
    from about 20 wt. % to about 40 wt. % of inorganic binder; and
    from about 1 wt. % to about 10 wt. % organic binder.

15. The method of claim 10, wherein each of the plurality of through-channels has a diameter d such that 20 μm≤d≤2000 μm.

16. The method of claim 10, wherein the sorbent substrate has a voidage V such that 25%≤V≤75%.

* * * * *